INVENTORS
S. F. ARANYI
J. P. BARLOW
E. J. PORCELLI
L. L. RAKOCZI
M. A. TORFEH
BY
Louis P. Elbinger May 5, 1970 S. F. ARANYI ET AL 3,510,844

INTERPROCESSING MULTICOMPUTER SYSTEMS

Filed July 27, 1966 3 Sheets-Sheet 3

United States Patent Office 3,510,844

Patented May 5, 1970

3,510,844

INTERPROCESSING MULTICOMPUTER SYSTEMS

Steven F. Aranyi, Woburn, Mass., Jesse P. Barlow, Reseda, Calif., Ernest J. Porcell and Laszlo L. Rakoczi, Phoenix, Ariz., and Mark A. Torfeh, Tarzana, Calif., assignors to General Electric Company, a corporation of New York Continuation-in-part of application Ser. No. 508,168, Nov. 16, 1965. This application July 27, 1966, Ser. No. 568,343

Int. Cl. G06f 13/00

U.S. Cl. 340—172.5 7 Claims

ABSTRACT OF THE DISCLOSURE

A pair of multicomputer systems is disclosed in each of which a central controller directs and schedules all communications between the processors and data storage members. Communication between a processor of one multicomputer system and the data storage member of the other is provided by intersystem coupling means interconnecting the central controllers of the two systems.

This application is a continuation-in-part of U.S. patent application Ser. No. 508,168, filed Nov. 16, 1965.

This invention relates to apparatus for providing communication between a pair of data processing systems and more particularly to apparatus providing interprocessing among a plurality of multicomputer systems.

A multicomputer system comprises a plurality of data processors, a plurality of data storage units, and a plurality of input devices and output devices. The data processors process data by executing separate programs or program parts simultaneously. The data storage units store data to be processed, data which is the result of processing, and programs for controlling the processing operations of the data processors. The input devices supply programs and data to be processed and the output devices receive and utilize processed data. A central controller is provided for the data processors to receive programs and data to be processed from the data storage units and to transmit processed data to the data storage units. In the multicomputer system described one or more input/output processors provide common control and data transmission centrals for a plurality of input devices and a plurality of output devices. Accordingly, the central controller also provides for the input/output processors to transfer programs and data to be processed to the data storage units from the input devices and to transfer processed data from the data storage units to the output devices.

Each data processor of a multicomputer system executes a program or program part separately from the programs and program parts being executed by the other data processors. The program comprises a set of instructions, each instruction specifying a discrete type of processing operation. A data processor executes a program by sequentially responding to each of the instructions of the program to perform the corresponding operations. The data processor obtains the instructions of a program in sequence from a set of storage locations, or "cells," in the data storage system, which comprises the plurality of data storage units. Each such cell is identified by a unique identification, termed an "address." Thus, in obtaining the instructions of a program in proper sequence the data processor supplies the corresponding addresses in sequence. Additionally, many of the instructions during execution require the data processor to further communicate with the data storage system, either to obtain a data item on which the data processor is to perform an operation or to store a data item which is the result of an operation. Accordingly, each instruction requiring a transfer of a data item between the data processor and the data storage system must also identify the cell which is to supply or receive the data item. Therefore, each program requires a set of cells for storing and supplying data items to be processed by the program, for receiving and storing data items which are the result of processing operations performed by the program, and for storing the instructions of the program, many of the stored instructions comprising an identification of a cell in the set.

A program is only executed by the multicomputer system after it has been presented for execution by an input device. An advanced form of management control implemented by the central controller of the above-mentioned patent application provides most effective and efficient execution of the waiting progams, by providing that, instead of waiting for the availability of specific storage space, each waiting program is accepted from an input device and transferred to the data storage system as soon as the data storage system has free any storage space which is of sufficient capacity and which is provided by the required combination of data storage unit types. After transfer to the data storage system these programs are executed according to their relative urgencies and the availability of the input and output devices required by each program.

However, in utilizing this advanced form of management control the particular portion of the data storage system in which a program is to be stored and executed is not determinable when the program is prepared or when it is being presented by an input device; instead, the storage portion to be employed varies according to the other programs already present when a program is accepted into the data storage system. Accordingly, the instructions in each program which identify data storage system cells can identify neither specific data storage units nor specific cells in a data storage unit; instead, the instructions can identify only symbolically the relative disposition of the cells in which the program is to be executed. In obtaining the instructions of the program in proper sequence, the data processor must supply in sequence symbolic identifications, or symbolic addresses, of cells appropriately disposed relative to the cells identified by the symbolic addresses provided by the instructions. Additionally, the symbolic addresses supplied by a data processor during execution of a program will identify a symbolic set of contiguous data storage system cells within which the instructions, the data items to be processed, and the processed data items are stored or to be stored.

To realize the benefits from the above-described advanced form of management control for a multicomputer system, an address translating device of the central controller provides for simply, reliably and rapidly converting the symbolic addresses of the storage cells supplied by the programs and the data processors into corresponding actual addresses of the storage cells in which the instructions of the program, the data items to be processed, and the processed data items are stored or to be stored.

A multicomputer system of the type described herein may be operated yet more efficiently by providing interprocessing capabilities with at least another multicomputer system. A group of multicomputer systems may be linked for interprocessing by providing each multicomputer system of the group the capability of receiving data for processing from and of transmitting processed data to another multicomputer system of the group. Interprocessing may also provide the capability of the transfer of programs between the multicomputer systems of the group.

Interprocessing multicomputer systems provide data processing capabilities beyond the scope of the data processing capabilities of the individual multicomputer systems. For example, an overloaded multicomputer system may utilize the services of another system that is not processing data at its maximum capacity; a multicomputer system may refer certain specialized tasks to another system better qualified to perform these tasks; one system temporarily requiring more storage capacity may employ the data storage units of another system; one system not equipped with a particular kind of input device or output device may utilize an input or output device of another system; the separate program parts of a complete program may be executed simultaneously by the data processors of two or more linked multicomputer systems to provide very rapid completion of a large and urgently needed data processing task; or the input or output devices of two or more multicomputer systems may operate simultaneously to supply large quantities of input data or to utilize large quantities of output data for a program being executed in one multicomputer system.

One form of such interprocessing multicomputer systems has been described in the copending U.S. patent application Ser. No. 555,491 of D. L. Bahrs et al. for Intercommunicating Multiple Data Processing System, filed June 6, 1966, and assigned to the assignee of the instant invention. In the Bahrs application interprocessing is effected by providing direct communication between a data processor of one multicomputer system and the central controller of another system. When such a data processor is executing a program wherein an instruction of the program or a data item to be processed must be obtained from another multicomputer system or wherein a processed data item is to be transferred to another system, the data processor supplies the address of a storage cell of a data storage unit in this other system. The data processor also supplies control signals at this time, the control signals denoting the type of operation the central controller and storage unit of the other system are to perform. The data processor transfers the address and control signals to a communication network linking the two systems and the network transmits the address and control signals to the central controller of the other system. The recipient central controller responds to the data storage unit address to transfer the address and control signals to the identified storage unit. The storage unit then executes the operation denoted by the received control signals and the central controller transfers a data item or an instruction between the originating processor and the storage unit through the communicating network.

In the above-described interprocessing system the data processor controls and directs the interprocessing operation by supplying the address and control signals directly to the inter-system communication network, rather than to the central controller of its own multicomputer system, the address being intelligible to the recipient multicomputer system. Thus, a data processor must be "aware" of each program requirement to communicate with another multicomputer system and must make appropirate "decisions" so that the communication network is employed and so that an intelligible address for the other system is provided. However, it is desirable to provide an interprocessing multicomputer system more compatible with the multicomputer systems previously described herein, wherein not only the particular data storage portion of the multicomputer system in which a program is to be stored and executed need not be determined when a program is prepared, but wherein neither the multicomputer system which is to execute the program nor the multicomputer system which is to provide storage of the program and its associated data need be known and provided for when the program is prepared. It is desirable that the multicomputer system to be assigned to execute a program and the storage portions of any one or more of the linked systems to be employed be permitted to vary according to the other programs already present, assigned to, and being executed by the components of the interprocessing multicomputer system. Accordingly, it is desirable to provide an interprocessing multicomputer system in which the instructions of each program select no specific multicomputer system, identify no specific data storage units, and denote no specific cells in a data storage unit; instead, each instruction would identify only symbolically the relative dispositions of the set of cells in which the program is to be executed.

Therefore, it is an object of this invention to provide management control apparatus for increasing the effectiveness and efficiency with which programs are executed by interprocessing multicomputer systems.

Another object of this invention is to provide improved apparatus for enabling communication between any data storage system of a plurality of linked data processing systems and any data processor in the systems.

Another object of this invention is to provide apparatus for enabling communication between any data storage system of a plurality of linked data processing systems and any data processor in the systems in response to symbolic identifications of storage system locations provided by the processor.

Another object of this invention is to provide interprocessing multicomputer systems wherein the programs which are executed identify symbolically the cells of the data storage units of the multicomputer systems.

Another object of this invention is to provide interprocessing multicomputer systems wherein the programs which are executed identify symbolically the multicomputer system to participate in an operation.

Another object of the invention is to provide interprocessing multicomputer systems wherein no data processor executing a program need identify particularly the one of the multicomputer systems providing storage for the data being processed by the program.

The foregoing objects are achieved, according to one embodiment of the instant invention, by providing an intersystem communication network which couples together the central controllers of the interprocessing multicomputer systems. A central controller is provided with a plurality of processor ports and a plurality of memory ports. Each processor port transfers signals between a respective data processor and the central controller. Each memory port transfers signals between a respective data storage unit and the central controller. The intersystem communication network couples a memory port of the central controller of a first multicomputer system to a processor port of the central controller of a second multicomputer system. The intersystem network simulates a data storage unit for the coupled memory port and a data processor for the coupled processor port.

All requests by a data processor for communication with a data storage unit are transmitted to the central controller of the multicomputer system of which the processor is a component part. Thus, whenever a data processor is executing a program wherein an instruction of a program or a data item to be processed must be obtained from a data storage unit or wherein a processed data item is to be transferred to a data storage unit, the data processor supplies a symbolic address and control signals denoting the type of data storage unit operation required.

The address translator of a central controller stores information relating to the actual addresses of the data storage unit cells which are allocated to the currently executed programs. When a processor, while executing a program, provides a symbolic address for which a cell has been allocated in the data storage system of the corresponding multicomputer system, the translator converts the symbolic address into the corresponding actual address and initiates delivery of the actual address and associated control signals to the corresponding data storage unit. However, the translator of the first multicomputer system also stores information relating to those programs or program parts for which cells of the data storage system of the second multicomputer system have been allocated. When a processor of the first system, while executing a program, provides a symbolic address for which a cell has been allocated in the second multicomputer system, the translator initiates delivery of the symbolic address and associated control signals to the intersystem network through the coupled memory port.

The intersystem network transmits the symbolic address and control signals to the processor port of the second multicomputer system. The translator of the second system connects the symbolic address received from the first system into the corresponding actual address and initiates delivery of the actual address and associated control signals to the corresponding data storage unit of the second system. The control signals thereupon provide transfer of a data item between the requesting processor of the first multicomputer system and the actually addressed data storage unit cell of the second multicomputer system through the intersystem network.

Accordingly, the apparatus of the instant invention implements interprocessing multicomputer systems wherein a data processor, while executing a program, need not identify the particular multicomputer system providing storage for the data being processed by the program and need not identify the particular data storage unit cell providing such storage. Instead, the instant invention provides that the data processor need identify only symbolically a multicomputer system to participate in an operation and the data storage unit cells providing storage for the data being processed.

Certain portions of the apparatus herein disclosed are not of our invention, but are the inventions of:

J. E. Belt, L. A. Hittel, and L. L. Rakoczi, as defined by the claims of their application, Ser. No. 612,560, filed Jan. 30, 1967;

J. P. Barlow, R. Barton, L. L. Rakoczi, and M. A. Torfeh, as defined by the claims of their application, Ser. No. 618,076, filed Feb. 23, 1967;

J. P. Barlow, R. Barton, E. J. Porcelli, L. L. Rakoczi, and M. A. Torfeh, as defined by the claims of their application, Ser. No. 619,377, filed Feb. 28, 1967;

S. F. Aranyi, J. P. Barlow, L. L. Rakoczi, L. A. Hittel, and M. A. Torfeh, as defined by the claims of their application, Ser. No. 623,284, filed Mar. 15, 1967; and J. R. Hudson, L. L. Rakoczi, and D. L. Sansbury, as defined by the claims of their application, Ser. No. 646,504, filed on or about June 16, 1967; all such applications being assigned to the assignee of the present application.

DESCRIPTION OF DRAWINGS

The invention will be described with reference to the accompanying drawings, wherein:

FIG. 111 is a block diagram of an embodiment of the instant invention; and

Figure 1:
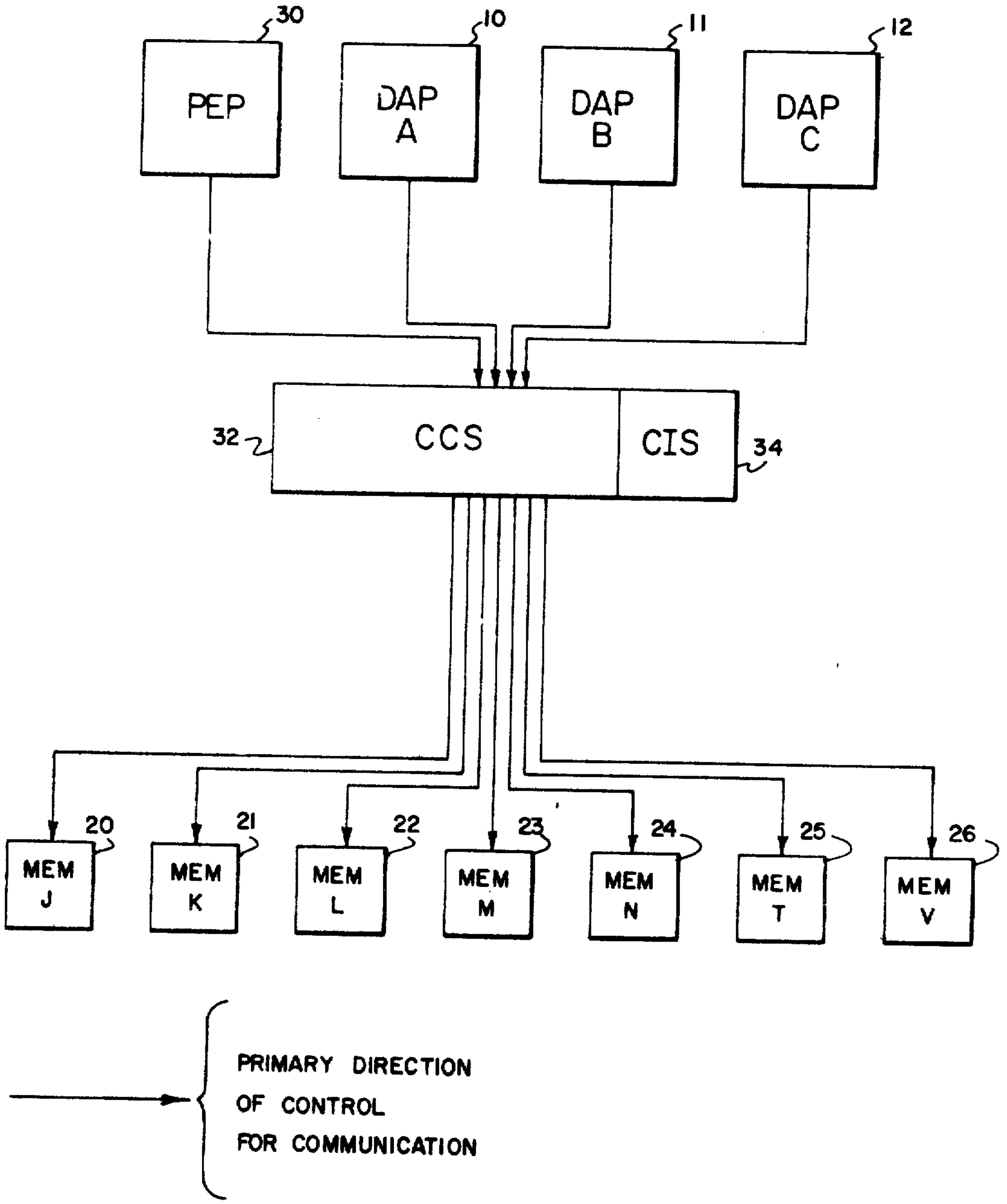
FIG. 1 is a block diagram of a Multicomputer Data Processing System to which the instant invention is applicable.
Figure 2:
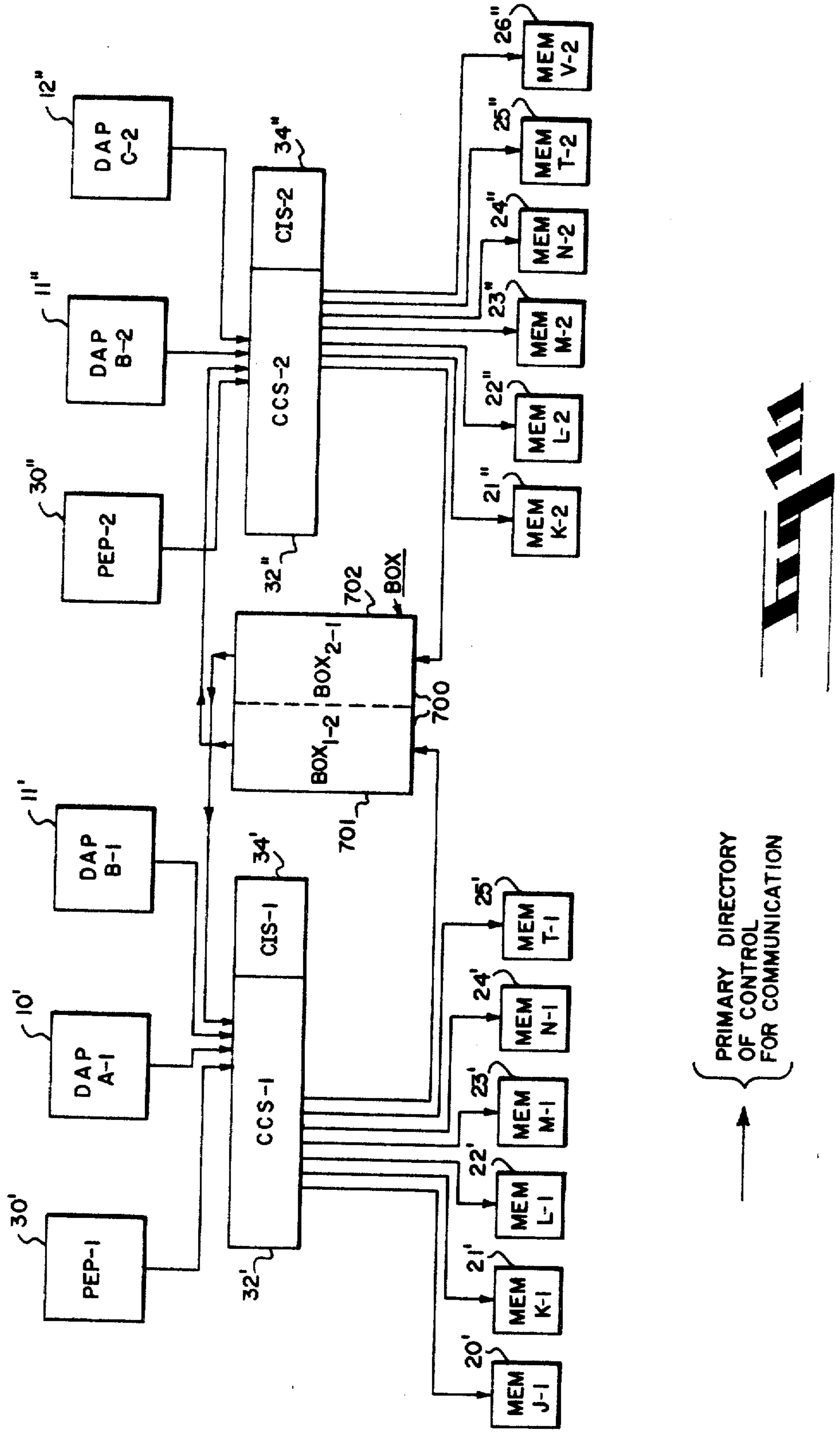

For a description of the system of FIG. 1 and my invention, reference is made to U.S. patent application, Ser. No. 542,768, filed Apr. 15, 1966, entitled "Centrally Controlled Multicomputer System" by Jesse P. Barlow, Richard Barton, John E. Belt, Carlton R. Frasier, Lorenz A. Hittel, Laszlo L. Rakoczi, Mark A. Torfeh, and Jerome B. Wiener, and assigned to the assignee of the present invention. More particularly, attention is directed to FIGS. 2 through 110 of the drawings and to the specification beginning at column 8, line 4, and ending at column 173, line 9, inclusive of U.S. Pat. 3,444,525, application Ser. No. 542,768, which are incorporated herein by reference and made a part hereof as is fully set forth herein.

INTERPROCESSING MULTICOMPUTER SYSTEMS

Each of the pair of Multicomputer Systems of FIG. 111 is adapted to process information stored in the Memory group of the other System as well as the information stored in its own Memory group. Each Data Processor of the pair of Multicomputer Systems communicates with the Memories of its System and the Memories of the other System to obtain the instruction words of the program the Data Processor is executing, to retrieve operand words for processing and to store operand words representing information which is the result of processing. Each Peripheral Processor communicates with the Memories of its System and the Memories of the other System to transfer Data Words between a Memory and an external device.

Multicomputer Systems–1 comprises one or more Data Processors, such as DAP's, 10′ and 11′, and may comprise one or more Peripheral Processors, such as PEP 30′. Multicomputer System–1 also comprises a plurality of Memories 20′, 21′, 22′, 23′, 24′, and 25′. Additionally, Multicomputer System–1 includes a Central Control Subsystem 32′, CCS–1, for directing and scheduling all communication between Processors 10′, 11′, and 30′ and Memories 20′–25′. CCS–1 also directs and schedules communication between Processors 10′, 11′, and 30′ and the Memories of Multicomputer System–2. Finally, Multicomputer System–1 includes a Central Interrupt Scheduler 34′, CIS–1, for controlling, scheduling, and maintaining the status of the set of programs being executed by DAP's 10′ and 11′.

Multicomputer System–2 comprises one or more Data Processors, such as DAP's 11″ and 12″, and may comprise one or more Peripheral Processors, such as PEP 30″. Multicomputer System–2 also comprises a plurality of Memories 21″, 22″, 23″, 24″, 25″, and 26″. Additionally, Multicomputer System–2 includes a Central Control Subsystem 32″, CCS–2, for directing and scheduling all communication between Processors 11″, 12″, and 30″ and Memories 21″–26″. CCS–2 also directs and schedules communication between Processors 11″, 12″, and 30″ and the Memories of Multicomputer System–1. Finally, Multicomputer System–2 includes a Central Interrupt Scheduler 34″, CIS–2, for controlling, scheduling, and maintaining the status of the set of programs being executed by DAP's 11″ and 12″.

CCS–1 and CCS–2 each enable communication between a Processor of the respective Multicomputer System and the Memory group of the other Multicomputer System through one or more "bridgeports." Generally, the term "port," as employed herein identifies the set of leads connected to the CCS on which the CCS receives signals from and transmits signals to a Processor or a Memory. Therefore, a port is the means by which the CCS communicates with a Processor or Memory, and a Processor port and a Memory port cooperate to provide communication between a Processor and a Memory under control of the Processor. The nature of a port is illustrated in FIG. 7, wherein a port of 81 leads transmits signals between each DAP and the CCS, the port coupling the CCS to a PEP comprises 84 leads, and the port coupling the CCS to a Memory comprises 77 leads.

For convenience herein, each CCS port may be identified by the Processor or Memory coupled thereby. For example, CCS–1 is coupled to DAP A–1 by port A–1, to PEP–1 by port P–1, and to Memory M–1 by port M–1. Similarly, CCS–2 is coupled to DAP B–2 by port B–2, to PEP–2 by port P–2, and to Memory L–2 by port L–2.

A CCS port employed to provide communication with another Multicomputer System is termed a bridgeport. In the instant embodiment, a Memory port of a first Multicomputer System and a Processor port of a second Multicomputer System are coupled to provide communication between a Processor of the first Multicomputer System and the Memory group of the second Multicomputer System under control of the Processor. For example, the port of CCS–1 normally employed to provide communication with Memory V–1 (FIG. 1), identifiable as port V–1, and the port of CCS–2 normally employed to provide communication with DAP A–2, identified as port A–2, are coupled to function as cooperating bridgeports to provide communication between a Processor of Multicomputer System–1 and the Memory group of Multicomputer System–2. Additionally, the port of CCS–2 normally employed to provide communication with Memory J–2, identified as port J–2, and the port of CCS–1 normally employed to provide communication with DAP C–1, identified as port C–1, are coupled to function as cooperating bridgeports to provide communication between a Processor of Multicomputer System–2 and the Memory group of Multicomputer System–1.

To provide most efficient operation and to enable substantially independent operation of the two Multicomputer Systems, while at the same time providing interprocessing capabilities, the cooperating bridgeports of the two Systems are coupled together by a Bridgeport Exchange apparatus (BOX) 700. The BOX provides direct Memory addressing between the requesting Processor of one Multicomputer System and the assigned Memory of the other Multicomputer System. Additionally, the BOX provides temporary storage of each Data Word being transferred between the requesting Processor and the assigned Memory. Thus, the BOX enables the Data Buses of the two communicating Multicomputer Systems to be granted in succession to the communication, each Data Bus being allocated to the communication only when the transmission of a Data Word therethrough can be immediately effected. Accordingly, the two communicating Multicomputer Systems are freed from the necessity of synchronizing the granting of their respective Data Buses in order to transfer a Data Word between a Processor in one Multicomputer System and a Memory in another.

The BOX comprises two independently operable sections, designated respectively as $BOX_{1-2}$ 701 and $BOX_{2-1}$ 702. $BOX_{1-2}$ provides communication between the Processors of Multicomputer System–1 and the Memory group of Multicomputer System–2. In the instant embodiment, $BOX_{1-2}$ couples port V–1 of CCS–1 to port A–2 of CCS–2. BOX $_{2-1}$ provides communication between the Processors of Multicomputer System–2 and the Memory group of Multicomputer System–1. In the instant embodiment, $BOX_{2-1}$ couples port J–2 of CCS–2 to port C–1 of CCS–1.

A summary description of the operation of the apparatus of FIG. 111 follows. Assume, first, that DAP B–1 is requesting a Clear-Write memory operation and that the Memory to be assigned for the operation is in Multicomputer System–2. When the request of DAP B–1 is accepted by the CAT of CCS–1, the Symbolic Address supplied by DAP B–1 is translated into an identification of Multicomputer System–2. This identification controls CCS–1 to directly transmit the original Symbolic Address from port V–1 through BOX $_{1-2}$ to port A–2 of CCS–2, the transmission being recognized by CCS–2 as a memory request from Multicomputer System–1. When the request of Multicomputer System–1 is accepted by the CAT of CCS–2, the original Symbolic Address is translated into an identification of a Memory of Multicomputer System–2 and an Actual Address for this Memory. CCS–2 thereupon transfers the Actual Address to the identified Memory and controls this Memory to initiate a Clear-Write operation.

Following transmission of the address to $BOX_{1-2}$ by CCS–1 and after the requesting DAP B–1 of Multicomputer System–1 has made available a Data Word for storage, the CIC–B/S of CCS–1 enables the corresponding CDX to grant the Data Bus thereof to DAP B–1. The Data Bus then transmits the available Data Word from the requesting DAP B–1 to $BOX_{1-2}$, wherein the Data Word is temporarily stored. After storage of the Data Word in $BOX_{1-2}$, CCS–2 enables the corresponding CDX to grant the Data Bus thereof to transmit the Data Word from $BOX_{1-2}$ to the assigned Memory of Multicomputer System–2, thereby completing the required communication.

If, instead, in the instant example of operation, DAP B–1 is requesting a Read-Restore memory operation, the transfer of an Actual Address to the assigned Memory of Multicomputer System–2 controls this Memory to initiate a Read-Restore operation. The responding Memory immediately commences the Read-Restore operation by retrieving a Data Word and inserting the Data Word in its Memory Register. The CIC–B/S of CCS–2 thereupon enables the corresponding CDX to grant the Data Bus thereof to transmit the Data Word from the Memory to $BOX_{1-2}$, wherein the Data Word is temporarily stored. After storage of the Data Word in $BOX_{1-2}$, CCS–1 enables the corresponding CDX to grant the Data Bus thereof to transmit the Data Word from $BOX_{1-2}$ to DAP B–1, thereby completing the required communication.

Accordingly, $BOX_{1-2}$ performs the functions of a memory for CCS–1 and a processor for CCS–2. In a similar manner, $BOX_{2-1}$ performs the functions of a memory for CCS–2 and a processor for CCS–1.

Bridgeport exchange

Figure 112:
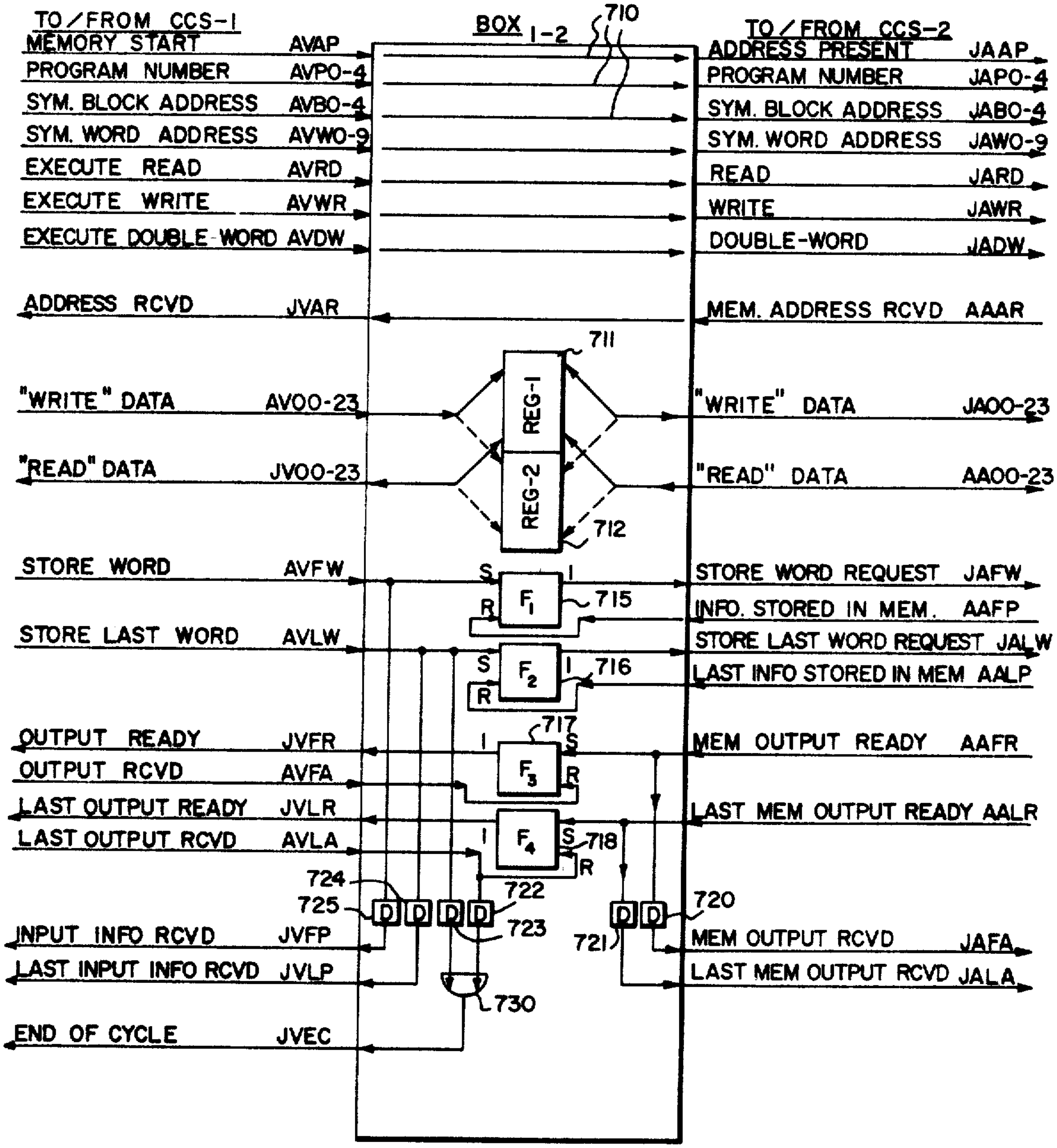
FIG. 112 is a schematic diagram of the BOX of FIG. 111.

The $BOX_{1-2}$ section of the Bridegport Exchange is shown in FIG. 112. $BOX_{1-2}$ provides a communication link between port V–1 of CCS–1 and port A–2 of CCS–2. $Box_{1-2}$ simulates a memory port V–1 and, therefore, exchanges a memory-type signal set with CCS–1, this signal set comprising data, address, control, and acknowledgment signals. $BOX_{1-2}$ simulates a processor for port A–2 and, therefore, exchanges a processor-type signal set with CCS–2, this signal set comprising data, address, control, and acknowledgment signals.

$BOX_{1-2}$ comprises transfer signal lines 710 to provide direct transfer of address signals and certain control and acknowledgment signals between ports V–1 and A–2. $BOX_{1-2}$ also comprises a pair of data word registers 711 and 712 for providing temporary storage of each Data Word being transmitted between the two Systems. Additionally, $BOX_{1-2}$ comprises a set of flip-flops 715, 716, 717 and 718 for providing temporary storage of representations of certain control and acknowledgment signals transmitted by ports V–1 and A–2.

Double-word, read-restore

To explain the detailed operation of the Bridgeport Exchange, assume first that DAP B–1 is requesting a double-word, Read-Restore memory operation. A double-word, Read-Restore operation is executed when DAP B–1 provides the JBAP, JBRD, and JBDW control signals, which constitute a request by DAP B–1. The JBAP signal indicates that a Symbolic Address is being supplied by DAP B–1, the JBRD signal denotes that DAP B–1 is requesting a Read-Restore operation, and the JBDW signal indicates that two Data Words are to be transferred during the Read-Restore operation. The Symbolic Address supplied by DAP B–1 comprises a Symbolic Word Address portion, represented by the JBW0–9 signals, a Symbolic Block Address portion, represented by the JBB0–4 signals, and a Program Number portion, represented by the JBP0–4 signals.

Upon accepting a request of DAP B–1, the CAT of CCS–1 translates the combined Symbolic Block Address and Program Number into (1) an identification of the Memory which the CAT assigns to DAP B–1 for communication, and (2) an Actual Block Address for such Memory. The CAT may recognize one or more block numbers, one or more Program Numbers, or Program Number-block number combinations for identifying the Memory group of Multicomputer System–2 as the source of the source of the two Data Words being requested. Therefore, if the Symbolic Address is interpreted by the CAT to identify Multicomputer System–2, the CAT translates this Symbolic Address into an identification of port V–1, but does not translate the Symbolic Block Address portion. Accordingly, the FCBV flip-flop of CAT Output Register 305 (FIG. 15) is set to the 1-state to designate the assignment of port V–1 for communication with DAP B–1. Additionally, the DCB0–4 signals of CAT Output Latch set 309 are set to represent the untranslated Symbolic Block Address and the DCB6 signal is set to the 1-state for control purposes in the instant communication.

The CAT of CCS–1 next notifies the corresponding CIC–R/S that DAP B–1 has made a memory request and identifies port V–1 as having been assigned to DAP B–1 for communication. The CIC–R/S then stores this notification, provided that $BOX_{1-2}$ is not busy. The request normally is granted immediately by the CIC–R/S if $BOX_{1-2}$ is not also being requested by PEP–1 or DAP A–1, which are accorded higher priority, the CIC–R/S granting the request by controlling issuance of the corresponding TTBS memory start signal by the CAT and by enabling corresponding CAX gates of CCS–1 to transfer the Actual Address through port V–1 to $BOX_{1-2}$. Accordingly, at this time the CIC–R/S delivers the DXBV gate enabling signal to the CAX to provide transfer to port V–1 of the Symbolic Word Address signals provided by DAP B–1, the Symbolic Block Address signals provided by Output Latch set 309, control signals provided by DAP B–1 and the memory start signal provided by the CAT.

Port V–1 delivers the Symbolic Word Address signals redesignated as the AVW0–9 signals, the Symbolic Block Address signals redesignated as the AVB0–4 signals, the execute read signal redesignated as the AVRD signal, the execute double-word signal redesignated as the AVDW signal, and the memory start signal redesignated as AVAP signal. Additionally, the original Program Number signals provided by DAP B–1 are transferred by the CAX to port V–1 where they are redesignated as the AV0–4 signals. One manner in which the transfer of these Program Number signals through the CAX may be effected is by employing the DXVB gate enabling signal and the DCB6 latch signal to conjointly enable additional CAX gates to transmit the JBP0–4 Program Number signals to port V–1. Thus, the Symbolic Address signals delivered by the port V–1 represent the original Program Number, Symbolic Block Address, and Symbolic Word Address supplied by DAP B–1.

The Symbolic Address signals and the AVAP, AVRD, and AVDW control signals delivered by port V–1 are transferred without delay or alteration through $BOX_{1-2}$ by transfer signals lines 710 and transmitted to port A–2 of CCS–2. These signals are again redesignated on the output side of $BOX_{1-2}$ to correspond to the designations of signals normally applied to a CCS processor port. Accordingly, the AVP0–4 Program Number signals are redesignated as the JAP0–4 signals, the AVB0–4 Symbolic Block Address signals are redesignated as the JAB0–4 signals, and the AVW0–9 Symbolic Word Address signals are redesignated as the JAW0–9 signals. Additionally, the AVAP memory start signal is redesignated as the JAAP signal, the AVRD execute read signal is redesignated as the JARD signal and the AVDW execute double-word signal is redesignated as the JADW signal.

The JAAP, JARD, and JADW signals delivered by $BOX_{1-2}$ simulate a processor request to the Memory group of Multicomputer System–2 for a double-word Read-Restore operation. The JAP0–4, JAB0–4, and JAW0–9 signals are interpreted by CCS–2 as the Symbolic Address provided with the simulated processor request.

Upon accepting the simulated processor request of $BOX_{1-2}$, the CAT of CCS–2 translates the combined Symbolic Block Address and Program Number to (1) an identification of the Memory of Multicomputer System–2 which the CAT assigns to port A–2 for communication and (2) an Actual Block Address for such Memory. The CAT of CCS–2 then notifies the corresponding CIC–R/S that a memory request has been made by port A–2 and identifies the particular Memory assigned to port A–2 for communication. When the request is granted by the CIC–R/S, a memory start signal is initiated and the CAX gates of CCS–2 are enabled to transfer the Actual Address generated in CCS–2 to the assigned Memory–*j*.

When the CAX of CCS–2 delivers the A*j*AP memory start signal to Memory–*j*, it also delivers the A*j*RD signal, which controls Memory–*j* to execute a Read-Restore cycle, and the A*j*DW signal, which controls the cycle to be a double-word cycle. Memory–*j* responds to these control signals to transmit the J*j*AR signals, which denotes that Memory–*j* has received the Actual Address (FIG. 25) and has initiated the required operation. The J*j*AR pulse is transferred through the CCX of CCS–2 and, redesignated as the AAAR signal, is transmitted from port A–2 to $BOX_{1-2}$. The AAAR signal is transferred, without delay, through $BOX_{1-2}$ by transfer lines 710 and transmitted to port V–1 of CCS–1, the signal as transmitted to CCS–1, being redesignated as the JVAR signal.

The JVAR signal is transferred through the CCX of CCS–1 and, redesignated as the ABAR signal, is transmitted to the requesting DAP B–1. The ABAR signal indicates to DAP B–1 that its request has been granted and that the required Memory operation has been initiated in the assigned Memory. In response to the ABAR signal, the JBAP signal and all Symbolic Address signals provided by DAP B–1 are terminated. Termination of the JBAP signal terminates the Symbolic Address signals delivered by port V–1 of CCS–1 and, in turn, the Symbolic Address signals delivered by the CCS–2. However, the double-word, Read-Restore operation now has been initiated in the assigned Memory of Multicomputer System–2 and the operation will continue to completion.

The above description illustrates the cascaded disposition of CCS–1 and CCS–2 in delivering an address from a processor of Multicomputer System-1 to a Memory of Multi-Computer System-2 and in initiating an operation in such Memory. In this cascaded disposition the initial Symbolic Address is interpreted by the CAT of CCS–1, is transmitted through port V–1, $BOX_{1-2}$, and port A–2, and is translated by the CAT of CCS–2 to provide an Actual Address, and this final Actual Address is directed to the assigned Memory of Multicomputer System-2. Accordingly, in the instant embodiment, the original address provided by the requesting processor of one Multicomputer System is transmitted unaltered to the other Multicomputer System for translation and assignment of a memory thereby.

Meanwhile, the CIC–B/S in both CCS–1 and CCS–2 has received notification from the respective CIC–R/S that a memory operation has been initiated in the Memory assigned by the respective CAT and that the CIC–B/S may initiate transfer of a Data Word between the corresponding assigned Memory and requesting processor port. The CIC–B/S of the CCS–1 prepares to assign the Data Bus thereof for transfer of a Data Word from $BOX_{1-2}$ to DAP B–1 and the CIC–B/S of CCS–2 prepares to assign the Data Bus thereof for transfer of a Data Word from the assigned Memory-*j* of Multicomputer System-2 to $BOX_{1-2}$. However, neither CIC–B/S actually completes the assignment of its respective Data Bus for the requested transfer until a signal is received from the Data Word source denoting that the Data Word is actually available and ready for transfer. Thus, a CIC–B/S requires a signal at the assigned memory port which denotes that a First Data Word is ready at that port, before the Data Bus is allocated to the transfer of the two Data Words of a double-word operation.

In the instant example, the assigned Memory-*j* of Multicomputer System-2 supplies the J*j*FR signal to the corresponding CIC–B/S to denote that a First Data Word is ready in the Memory Register of Memory-*j*. The CIC–B/S of CCS–1 requires a simulated JVFR signal to issue from $BOX_{1-2}$ before the CIC–B/S assigns the Data Bus for transfer of two Data Words from $BOX_{1-2}$ to DAP–1. This JVFR signal is not supplied by $BOX_{1-2}$ until after a First Data Word has been transmitted to $BOX_{1-2}$ from port A–2 and stored in Register-1 of $BOX_{1-2}$. Accordingly, the respective Data Buses of CCS–2 and CCS–1 are assigned in succession to the joint communication operation, in the order named.

Following the initiation of the double-word Read-Restore operation in Memory-*j* of Multicomputer System-2 in response to the request of the DAP–1, the apparatus of FIGS. 111 and 112 prepares to transfer two Data Words from the Memory-*j* to DAP B–1. Responding to the A*j*RD signal, the assigned Memory-*j* executes a Read-Restore cycle to transfer a First Data Word into the Memory Register thereof. The J*j*FR signal is thereupon transmitted by Memory-*j* to provide notification that a First Data Word, represented by the J/00–23 signals, is available from Memory-*j*.

The CIC–B/S of CCS–2 responds to the J*j*FR signal to enable the CDX gates to grant the Data Bus of CCS–2 for the transfer of two successive Data Words between Memory-*j* and $BOX_{1-2}$. When the Data Bus has been so granted, the CDX of CCS–2 transfers therethrough the J*j*FR and **J*j*00–23 signals and transmits these signals, redesignated as the AAFR "memory output ready" signal and AA00–23** First Data Word signals, to $BOX_{1-2}$.

The AAFR signal transfers the $F_3$ flip-flop 717 of $BOX_{1-2}$ to the 1-state. The concurrence of the 1-state of the $F_3$ flip-flop and the 0-state of the $F_4$ flip-flop 718 controls a logical gate set, shown symbolically, for enabling entry of the AA00–23 First Data Word signals into Register-1.

The $F_3$ flip-flop provides temporary storage of a notification that a First Data Word is available for Multicomputer System-1. The 1-output signal of the $F_3$ flip-flop is employed to simulate a memory-originated control signal for providing notification as to when a First Data Word is available at port V–1 and, therefore, is designated as the JVFR signal.

The AAFR signal is also transmitted through a delay element 720. The output signal of delay element 720 is employed to simulate a processor acknowledgement of a First Data Word receipt and, therefore, is designated as the JAFA signal. The JAFA signal is transferred through the CIC–B/S of CCS–2 and, redesignated as the A*j*FA signal, is transmitted to Memory-*j*. The A*j*FA signal notifies Memory-*j* that the First Data Word supplied thereby has been received by the requesting processor ($BOX_{1-2}$) and that the Memory may terminate transmission of this Data Word. The J*j*FR signal and the First Data Word **J*j*00–23** signals are thereupon terminated.

Immediately after Memory-*j* of Multicomputer System-2 receives the A*j*FA acknowledgement signal the Last Data Word of the operation is prepared by Memory-*j* and is represented by the **J*j*00–23** signals. The J*j*LR signal, denoting the availability of this Last Data Word, is thereupon transmitted by Memory-*j* to CCS–2. The Last Data Word signals are immediately transmitted by the Data Bus of CCS–2 to $BOX_{1-2}$. At the same time the J*j*LR signal is transferred through the CDX of CCS–2 and, redesignated as the AALR "Last memory output ready" signal, is transmitted to $BOX_{1-2}$.

The AALR signal transfers the $F_4$ flip-flop of $BOX_{1-2}$ to the 1-state. The concurrence of the 1-state of the $F_3$ flip-flop and the 1-state of the $F_4$ flip-flop controls a logical gate set for enabling entry of the AA00–23 Last Data Word signals into Register-2.

The $F_4$ flip-flop provides temporary storage of a notification that a Last Data Word is available for Multicomputer System-1. The 1-output signal of the $F_4$ flip-flop is employed to simulate a memory-originated control signal for providing notification as to when a Last Data Word is available at port V–1 and, therefore, is designated as the JVLR signal.

The AALR signal is also transmitted through a delay element 721. The output signal of delay element 721 is employed to simulate a processor acknowledgement of a Last Data Word receipt and, therefore, is designated as the JALA signal. The JALA signal is transferred through the CIC–B/S and, redesignated as the A*j*LA signal, is transmitted to Memory-*j*. The A*j*LA signal notifies Memory-*j* that the required double-word Read-Restore operation have been completed and that the memory cycle may be terminated. The memory cycle is terminated by terminating the J*j*LR Last Data Word **J*j*00–23** signals. Memory-*j* thereupon transmits the J*j*EC signal to CCS–2 to clear all flip-flops therein which are controlling the instant Memory-BOX communication, and thereby enables the CIC–B/S of CCS–2 to assign the Data Bus to another Processor requesting communication with a Memory of Multicomputer System-2.

The CIC–B/S of CCS–1 responds to the JVFR signal, which is delivered by the $F_3$ flip-flop of $BOX_{1-2}$ after the First Data Word has been stored in Register-1, to enable the CDX gates to grant the Data Bus of CCS–1 for the transfer of two successive Data Words between $BOX_{1-2}$ and DAP B–1. The 1-output signal of the $F_4$ flip-flop is temporarily prevented from being transmitted to port V–1 by a logical gate set, not shown, when the 1-states of the $F_3$ flip-flop and the AVDW signal are concurrent. When the $F_3$ flip-flop is in the 1-state and the AVDW "execute double-word" signal is being received by $BOX_{1-2}$, a logical gate set is controlled to enable the contents of Register-1 to be transmitted to port V–1 as the JV00–23 signals. When the Data Bus has been assigned to port V–1 the CDX of CCS–1 transfers therethrough the JVFR and JV00–23 signals and transmits these signals, redesignated as the ABFR "memory output ready" signal and the AB00–23 First Data Word signals, to DAP B–1.

The ABFR signal notifies DAP B–1 that it may now accept the First Data Word. DAP B–1 thereupon accepts the First Data Word and transmits the JBFA acknowledgment signal to the CIC–B/S. The JBFA signal is transferred through the CIC–B/S of CCS–1 and, redesignated as the AVFA signal, is transmitted to $BOX_{1-2}$. The AVFA signal notifies $BOX_{1-2}$ that the First Data Word supplied thereby has been received by the requesting Processor (DAP B–1) and that $BOX_{1-2}$ may terminate transmission of this Data Word.

The AVFA signal transfers the $F_3$ flip-flop to the 0-state to enable transfer of the Last Data Word to Multicomputer System-1. The concurrence of the 1-state of the $F_4$ flip-flop and the 0-state of the $F_3$ flip-flop controls a logical gate set to enable the contents of Register-2 to be transmitted to port V–1 as the JV00–23 signals. The CDX of CCS–1 transfers therethrough the JVLR signal, now transmitted to port V–1, and the JV00–23 signals and transmits these signals, redesignated as the ABLR "last memory output ready" signal and the AB00–23 Last Data Word signals, to DAP B–1.

The ABLR signal notifies DAP B–1 that it may now accept the Last Data Word. DAP B–1 thereupon accepts the Last Data Word and transmits the JBLA acknowledgment signal to the CIC–B/S. Upon transmission of the JBLA signal, DAP B–1 terminates the JBRD and JBDW signals since DAP B–1 has completed its participation in the instant operation. The JBLA signal is transferred through the CIC–B/S of CCS–1 and, redesignated as the AVLA signal, is transmitted to $BOX_{1-2}$. The AVLA signal notifies $BOX_{1-2}$ that the required double-word, Read-Restore operation has been completed and that all associated functions may be terminated. The AVLA signal transfers the $F_4$ flip-flop to the 0-state to clear $BOX_{1-2}$ of all representations of Data Words stored therein.

The AVLA signal is also transmitted through a delay element 722 and applied to an OR-gate 730. The output signal of OR-gate 730 is employed to simulate a memory "end of cycle" signal and, therefore, is designated as the JVEC signal. The JVEC signal controls the CCS–1 to clear all flip-flops therein which are controlling the BOX–DAP B–1 communication, and thereby enables the CIC–B/S of CCS–1 to assign the Data Bus to another Processor requesting communication with a Memory of Multicomputer System-1.

Single-word, Read-Restore

Assume next that DAP B–1 is requesting a single-word, Read-Restore memory operation. A single-word, Read-Restore operation is executed when DAP B–1 provides the JBAP and JBRD control signals, the JBDW control signal continuing as a binary 0. The first portion of this operation is substantially the same as the first portion of the double-word, Read-Restore operation wherein the First Data Word is obtained. The primary difference is that for each control or acknowledgment signal provided for the First Data Word, the corresponding control or acknowledgment signal for the Last Data Word is provided simultaneously. Hence, when the single Data Word has been retrieved from Memory-*j* of Multicomputer System-2 and transferred through $BOX_{1-2}$ to DAP B–1, the presence of the Last Data Word control and acknowledgment signals enable immediate termination of the operation.

Thus, the J*j*LR signal is generated by Memory-*j* of Multicomputer System-2 at the same time that the J*j*FR signal is being generated for denoting the availability of the First Data Word. The corresponding AAFR and AALR signals are transmitted simultaneously to $BOX_{1-2}$ and transfer both of the $F_3$ and $F_4$ flip-flops to the 1-state. The concurrence of the 1-states of the $F_3$ and $F_4$ flip-flops controls the logical gate set described heretofore to enable the entry of the AA00–23 First Data Word signals into Register-2.

The AAFR and AALR signals are also transmitted simultaneously through the respective delay elements 720 and 721. The consequent simultaneous delivery of the JAFA and JALA output signals of these delay elements denotes that although $BOX_{1-2}$ has just received a First Data Word, it is not expecting another Data Word. The corresponding A*j*FA and A*j*LA signals are transmitted simultaneously to Memory-*j*. The A*j*LA signal notifies Memory-*j* that the required functions of the Read-Restore operation have been completed and that the Memory cycle may be terminated. Memory-*j* thereupon transmits the J*j*EC signal to clear CCS–2 to terminate control of the instant Memory-BOX communication.

The 1-state of the $F_3$ flip-flop and the 0-state of the AVDW "execute double-word" signal controls a logical gate set to enable the First Data Word contents of Register-2 to be transmitted to port V–1 as the JV00–23 signals. The CDX of CCS–1 transfers therethrough the concurrent JVFR and JVLR control signals and the JV00–23 First Data Word signals and transmits the corresponding ABFR, ABLR, and AB00–23 signals to DAP B–1.

DAP B–1 accepts the First Data Word and transmits simultaneously the JBFA and JBLA acknowledgment signals to the CIC–B/S. Upon transmission of these two signals, DAP B–1 terminates the JBRD signal since DAP B–1 has completed its participation in the instant operation. The JBFA and JBLA signals are transferred through the CIC–B/S of CCS–1. The consequent simultaneous delivery of the AVFA and AVLA signals to $BOX_{1-2}$ denotes that although DAP B–1 has just received a First Data Word, it is not expecting another Data Word. $BOX_{1-2}$ is thereupon cleared of all representations of Data Words stored therein and delivers the simulated JVEC signal to clear CCS–1 to terminate control of the instant BOX–DAP B–1 communication.

Double-word, clear-write

Assume now that DAP B–1 is requesting a double-word, Clear-Write memory operation. A double-word, Clear-Write operation is executed when DAP B–1 provides the JBAP, JBWR and JBDW control signals. As described previously, with respect to the double-word, Read-Restore operation, if the Symbolic Address supplied by DAP B–1 is interpreted by the CAT of CCS–1 to identify Multicomputer System-2, the CAT translates the Symbolic Address into an identification of port V–1. The CAT thereupon initiates transfer of the original Symbolic Address and the AVAP, AVWR, and AVDW control signals through $BOX_{1-2}$ to CCS–2, where the signals are interpreted as a simulated processor request for a double-word, Clear-Write operation.

The CAT of CCS–2 translates the Symbolic Address to an Actual Address and initiates transfer of the Actual Address to the assigned Memory-*j* of Multicomputer System-2. At the same time, the CAX of CCS–2 is controlled to deliver the A*j*AP, A*j*WR, and A*j*DW control signals to the assigned Memory-*j*. The A*j*AP signal controls Memory-*j* to initiate an operation, the A*j*WR signal controls the operation to be a Clear-Write cycle, and the A*j*DW signal controls the operation to also be a double-word cycle.

Upon commencing its cycle Memory-*j* transmits the J*j*AR signal, which denotes that Memory-*j* has received the Actual Address. The J*j*AR signal is transferred through the CCX of CCS–2, through $BOX_{1-2}$, through the CCX of CCS–1 and, redesignated as the ABAR signal, is transferred to DAP B–1. The ABAR signal indicates to DAP B–1 that its request has been granted and that the required memory operation has been initiated in the assigned Memory. In response to the ABAR signal the JBAP signal and all Symbolic Address signals provided by DAP B–1 are terminated. Termination of the JBAP signal terminates the corresponding Symbolic Address signals delivered by CCS–1 and CCS–2. However, the double-word, Clear-Write operation has been initiated in the assigned Memory of Multicomputer System-2 and the operation will continue to completion.

Meanwhile, the CIC–B/S in both CCS–1 and CCS–2 has received notification from the respective CIC–R/S that a memory operation has been initiated in the Memory assigned by the respective CAT and that the CIC–B/S may initiate transfer of a Data Word between the requesting processor port and the corresponding assigned Memory. The CIC–B/S of CCS–1 prepares to assign the Data Bus thereof for transfer of a Data Word from DAP B–1 to $BOX_{1-2}$ and the CIC–B/S of CCS–2 prepares to assign the Data Bus thereof for transfer of a Data Word from $BOX_{1-2}$ to the assigned Memory-*j* of Multicomputer System-2. However, neither CIC–B/S actually completes the assignment of its respective Data Bus for the requested transfer until a signal is received from the Data Word source denoting that the Data Word is actually available and ready for transfer.

In the instant example, DAP B–1 supplies the JBFW signal to the CIC–B/S of CCS–1 to denote that a First Data Word has been made available at port B–1. The CIC–B/S of CCS–2 requires a simulated JAFW signal to issue from $BOX_{1-2}$ before the CIC–B/S assigns the Data Bus for transfer of two Data Words from $BOX_{1-2}$ to the assigned Memory-*j*. This JAFW signal is not supplied by $BOX_{1-2}$ until after a First Data Word has been transmitted to $BOX_{1-2}$ from port V–1 and stored in Register-1 of $BOX_{1-2}$. Accordingly, the respective Data Buses of CCS–1 and CCS–2 are assigned in succession to the joint communication operation, in the order named.

When DAP B–1 makes its request, or immediately thereafter, it supplies a First Data Word, represented by the JB00–23 signals, and the JBFW signal for providing notification that the First Data Word is available from DAP B–1. The CIC–B/S of CCS–1 responds to the JBFW signal to enable the CDX gates to grant the Data Bus of CCS–1 for the transfer of two successive Data Words between DAP B–1 and $BOX_{1-2}$. When the Data Bus has been so granted the CDX of CCS–1 transfers therethrough the JBFW and JB00–23 signals and transmits these signals, redesignated as the AVFW "store word" signal and the AV00–23 First Data Word signals, to $BOX_{1-2}$.

The AVFW signal transfers the $F_1$ flip-flop 715 of $BOX_{1-2}$ to the 1-state. The concurrence of the 1-state of the $F_1$ flip-flop and the 0-state of the $F_2$ flip-flop 716 controls a logical gate set, shown symbolically, for enabling entry of the AV00–23 First Data Word signals into Register-1.

The $F_1$ flip-flop provides temporary storage of a notification that a First Data Word is available for Multicomputer System-2. The 1-output signal of the $F_1$ flip-flop is employed to simulate a Processor-originated control signal for providing notification as to when a First Data Word is available at port A–2, and, therefore, is designated as the JAFW signal.

The AVFW signal is also transmitted through a delay element 725. The output signal of delay element 725 is employed to simulate a Memory acknowledgment of a First Data Word receipt, and, therefore, is designated as the JVFP signal. The JVFP signal is transferred through the CIC–B/S of CCS–1 and, redesignated as the ABFP signal, is transmitted to DAP B–1. The ABFP signal notifies DAP B–1 that the First Data Word supplied thereby has been received by the assigned Memory ($BOX_{1-2}$) and that DAP B–1 may terminate transmission of this Data Word. The JBFW signal and the First Data Word JB00–23 signals are thereupon terminated.

Immediately after DAP B–1 receives the ABFP acknowledgment signal, the Last Data Word of the operation is prepared thereby and is represented by the JB00–23 signals. The JBLW signal, denoting the availability of this Last Data Word, is thereupon transmitted by DAP B–1 to CCS–1. The Last Data Word signals are immediately transmitted by the Data Bus of CCS–1 to $BOX_{1-2}$. At this time the JBLW signal is transferred through the CDX of CCS–1 and, redesignated as the AVLW "store last word" signal is transmitted to $BOX_{1-2}$.

The AVLW signal transfers the $F_2$ flip-flop of $BOX_{1-2}$ to the 1-state. The concurrence of the 1-states of the $F_1$ and $F_2$ flip-flops controls a logical gate set for enabling entry of the AV00–23 Last Data Word signals into Register-2.

The $F_2$ flip-flop provides temporary storage of the notification that a Last Data Word is available for Multicomputer System-2. The 1-output signal of the $F_2$ flip-flop is employed to simulate a processor-originated control signal for providing notification as to when a Last Data Word is available at port A–2 and, therefore, is designated as the JALW signal.

The AVLW signal is also transmitted through a delay element 724. The output signal delay element 724 is employed to simulate a Memory acknowledgment of a Last Data Word receipt, and, therefore, is designated as the JVLP signal. The JVLP signal is transferred through the CIC–B/S of CCS–1, and, redesignated as the ABLP signal, is transmitted to DAP B–1. The ABLP signal notifies DAP B–1 that the required functions of DAP B–1 have been completed in the double-word, Clear-Write operation, and that DAP B–1 may terminate the control signals. DAP B–1 thereupon terminates the JBWR, JBDW, JBLW, and JB00–23 signals. The AVLW signal is also transmitted through a delay element 723 and applied to OR-gate 730. The "end of cycle" signal delivered by OR-gate 730 again controls the CCS–1 to clear all flip-flops therein which are controlling the instant DAP B–1–BOX communication.

The CIC–B/S of CCS–2 responds to the JAFW signal, which is delivered by the $F_1$ flip-flop of $BOX_{1-2}$ after the First Data Word has been stored in Register-1, to enable the CDX gates to grant the Data Bus of CCS–2 for the transfer of two successive Data Words between $BOX_{1-2}$ and the assigned Memory-*j*. The 1-output signal of the $F_2$ flip-flop is temporarily prevented from being transmitted to port A–2 by a logical gate set, not shown, when the 1-states of the $F_1$ flip-flop and the AVDW signal are concurrent. When the $F_1$ flip-flop is in the 1-state and the AVDW "execute double-word" signal is being received by $BOX_{1-2}$ a logical gate set is controlled to enable the contents of Register-1 to be transmitted to port A–2 as the JA00–23 signals. When the Data Bus has been assigned to port A–2 the CDX of CCS–2 transfers therethrough the JAFW and JA00–23 signals and transmits these signals, redesignated as the A*j*FW "store word" signal and the A*j*00–23 First Data Word signals, to the assigned Memory-*j*.

The A*j*FW signal notifies Memory-*j* that it may now accept the First Data Word. Memory-*j* thereupon either completes a Clear-Write cycle to store the First Data Word in the memory location designated by the Actual Address, or temporarily stores the First Data Word in the Memory Register thereof. Immediately following storage of the First Data Word, Memory-*j* transmits the J*j*FP acknowledgment signal to the CIC–B/S. The J*j*FP signal is transferred through the CIC–B/S of CCS–2 and, redesignated as the AAFP signal, is transmitted to $BOX_{1-2}$. The AAFP signal notifies $BOX_{1-2}$ that the First Data Word supplied thereby has been received and stored by the assigned Memory and that $BOX_{1-2}$ may terminate transmission of this Data Word.

The AAFP signal transfers the $F_1$ flip-flop to the 0-state to enable transfer of the Last Data Word to Multicomputer System-2. The concurrence of the 1-state of the $F_2$ flip-flop and the 0-state of the $F_1$ flip-flop controls a logical gate set to enable the contents of Register-2 to be transmitted to port A–2 as the JA00–23 signals. The CDX of CCS–2 transfers therethrough the JALW signal, now transmitted to port A–2, and the JA00–23 signals and transmits these signals, redesignated as the A*j*LW "store last word" signal and the A*j*00–23 Last Data Word signals to the assigned Memory-*j*.

The A*j*LW signal notifies the assigned Memory-*j* that it may now accept the Last Data Word. Memory-*j* thereupon either completes a Clear-Write cycle to store the Last Data Word, or inserts the Last Data Word in the Memory Register and then completes the Clear-Write cycle if the First Data Word previously has been stored in the Memory Register.

Immediately following storage of the Last Data Word, Memory-*j* transmits the J*j*LP acknowledgment signal to the CIC–B/S. The J*j*LP signal is transferred through CCS–2 and, redesignated as the AALP signal, is transmitted to $BOX_{1-2}$. The AALP signal notifies $BOX_{1-2}$ that the required double-word, Clear-Write operation has been completed and that all asssociated functions may be terminated. The AALP signal transfers the $F_2$ flip-flop to the 0-state to clear $BOX_{1-2}$ of all representations of Data Words stored therein.

Following the transmission of the J*j*LP signal the assigned Memory-*j*, having completed the required double-word, Clear-Write operation, transmits the J*j*EC signal to CCS–2 to clear all flip-flops therein which are controlling the instant BOX-Memory-*j* communication.

Single-word, clear-write

Assume next that DAP B–1 is requesting a single-word, Clear-Write Memory operation. A single-word, Clear-Write operation is executed when DAP B–1 provides the JBAP and JBWR control signals, the JBDW control signal continuing as a binary 0. The first portion of this operation is substantially the same as the first portion of the double-word, Clear-Write operation wherein the First Data Word is stored. The primary difference is that for each control or acknowledgement signal provided for the First Data Word, the corresponding control or acknowledgment signal for the Last Data Word is provided simultaneously. Hence, when the single Data Word has been supplied by DAP B–1 and transferred through $BOX_{1-2}$ to Memory-*j* of Multicomputer System-2, the presence of the Last Data Word control and acknowledgment signals enable immediate termination of the operation.

Thus, the JBLW signal is generated by DAP B–1 at the same time that the JBFW signal is being generated for denoting the availability of the First Data Word. The corresponding AVFW and AVLW signals are transmitted simultaneously to $BOX_{1-2}$ and transfer both of the $F_1$ and $F_2$ flip-flops to the 1-state. The concurrence of the 1-states of the $F_1$ and $F_2$ flip-flops controls the logical gate set described heretofore to enable the entry of the AV00–23 First Data Word signals into Register-2.

The AVFW and AVLW signals are also transmitted simultaneously through the respective delay elements 725 and 724. The consequent simultaneous delivery of the JVFP and JVLP output signals of these delay elements denotes that although $BOX_{1-2}$ has just received a First Data Word, it is not expecting another Data Word. The corresponding ABFP and ABLP signals are transmitted simultaneously to DAP B–1. The ABLP signal notifies DAP B–1 that the required functions of DAP B–1 have been completed in the single-word, Clear-Write operation, and that DAP B–1 may terminate the control signals. DAP B–1 thereupon terminates the JBWR, JBFW, JBLW and JB00–23 signals. The AVLW signal is also transmitted through delay element 723 to OR-gate 730, and the "end of cycle" signal delivered by OR-gate 730 clears CCS–2 to terminate control of the instant DAP B–1–BOX communication.

The 1-state of the $F_1$ flip-flop and the 0-state of the AVDW "executive double-word" signal controls a logical gate set to enable the First Data Word contents of Register-2 to be transmitted to port A–2 as the JA00–23 signals. The CDX of CCS–2 transfers therethrough the concurrent JAFW and JALW control signals and the JA00–23 First Data Word signals and transmits the corresponding A*j*FW, A*j*LW, and A*j*00–23 signals to the assigned Memory-*j*.

Memory-*j* thereupon completes a Clear-Write cycle to store the First Data Word in the memory location designated by the Actual Address and transmits simultaneously the J*j*FP and J*j*LP acknowledgment signals to the CIC–B/S of CCS–2. The J*j*FP and J*j*LP signals are transferred through the CIC–B/S. The consequent simultaneous delivery of the AAFP and AALP signals to $BOX_{1-2}$ denotes that although Memory-*j* has just received a First Data Word, it is not expecting another Data Word. $Box_{1-2}$ is thereupon cleared of all representations of Data Words stored therein.

Following transmission of the J*j*LP signal the assigned Memory-*j*, having completed the required single-word, Clear-Write operation, transmits the J*j*EC signal to clear CCS–2 to terminate control of the instant BOX-Memory-*j* communication.

While the principles of the invention have now been made clear in an illustrative embodiment, there will be immediately obvious to those skilled in the art many modifications in structure, arrangement, proportions, the elements, materials, and components, used in the practice of the invention, and otherwise, which are particularly adapted for specific environments and operating requirements, without departing from those principles. The appended claims are therefore intended to cover and embrace any such modifications, within the limits only of the true spirit and scope of the invention.

What is claimed is:

1. Bridgeport exchange apparatus comprising: a register for storing a data word, and circuit means for generating control signals, said apparatus adapted to be connected between a memory port of a central controller of one data processing system and a processor port of a central controller of a second data processing system, said bridgeport exchange apparatus adapted to receive from the memory port of the central controller of the first system address signals and control signals from a processor of the first system when a data word is to be communicated between said processor and a data storage member of the second system, said bridgeport exchange apparatus transferring to the processor port of the central controller of the second system address signals and certain control signals received from the first system, temporarily storing the data word being communicated between the systems in the register thereof, producing notification signals informing the system to which the data word is being transmitted that the word is stored in the register of the exchange to permit completion of the communication, and producing a signal notifying the first system when the communication of a data word is completed.

2. Bridgeport exchange apparatus comprising: a register for storing data words, and circuit means for generating control and acknowledgment signals, said apparatus adapted to be connected between a memory port of a central controller of one data processing system and a processor port of a central controller of a second data processing system, said bridgeport exchange apparatus receiving from the memory port of the central controller of the first system address, control, and acknowledgment signals, the address and certain of the control signals representing a memory access request from a processor of the first system to initiate a memory cycle in a data storage member of the second system when a data word is to be communicated between said processor and said storage member; said bridgeport exchange apparatus supplying to the processor port of the central controller of the second system address signals and control signals from the first system, temporarily storing the data word being communicated between the systems in the register thereof, producing acknowledgment and control signals in forming the system to which the data word is being transmitted that the word is stored in the register of the exchange to permit completion of the communication, and producing a control signal notifying the first system when the memory cycle is completed.

3. In combination, a first data processing system and a second data processing system, each of said systems being capable of substantially independent operation, each of said systems having a processor, a data storage member having a plurality of addressable cells, and a central controller; each central controller having a plurality of memory ports and a plurality of processor ports; circuit means for coupling the processor of each system to a processor port of the central controller of its system; circuit means for coupling the data storage member of each system to a memory port of the central controller of its system; each processor providing address and control signals when it initiates a communication cycle with a data storage member; each central controller in response to the receipt of said signals from a processor controlling communication between the processor port to which the processor is connected and a memory port corresponding to the address signals; the data storage member connected to that port, in response to said signals, communicating a data word between a cell of said member and the processor and producing acknowledgment signals which are coupled through the central controller to said processor to complete the communication cycle; intersystem coupling means; circuit means interconnecting the intersystem coupling means with a memory port of the central controller of the first system; circuit means interconnecting said intersystem coupling means with a processor port of the central controller of the second system; said intersystem coupling means comprising means temporarily storing the data word to be communicated between the processor of the first system and the data storage member of the second system, means for transferring address and control signals available at the memory port to which the intersystem coupling means is connected to the processor port of the second system, and means for producing acknowledgment and control signals at the memory port of the central controller of the first system and at the processor port of the central controller of the second system to permit communication of a data word between a processor of the first system and the data storage member of the second system; said central controller of said first system, in response to predetermined address signals from a processor connected to one of its processor ports, connecting address signals and control signals to the memory port to which the intersystem coupling means is connected; said intersystem coupling means in response to the receipt of address and control signals from the central controller of the first system transferring the address and certain control signals to the processor port of the central controller of the second system, temporarily storing the data word being communicated between the systems, and supplying acknowledgment and control signals to the memory ports of the central controller of the first system and the processor port of the second syster controller to permit the communication of the data word to be completed.

4. The combination of claim 3 in which there is provided a second intersystem coupling means, circuit means interconnecting the second intersystem coupling means with a memory port of the central controller of the second system, and circuit means interconnecting the said intersystem coupling means with a processor port of the central controller of the first system.

5. The combination of claim 3 in which the address signals provided by each processor are symbolic addresses.

6. The combination of a first data processing system and a second data processing system, each of said systems being capable of substantially independent operation, each of said systems having a processor, an addressable data storage member having a plurality of addressable cells, and a central controller, each central controller having a plurality of memory ports and a plurality of processor ports, circuit means for coupling each processor of each system to a processor port of the central controller of the system, circuit means for coupling each data storage member of each system to a memory port of the central controller of the system, each central controller controlling all communication between processors connected to its processor ports and data storage members connected to its memory ports, each processor providing at the processor port to which it is connected address and control signals when it initiates a communication cycle with a data storage member and acknowledgment signals during the cycle, each central controller, in response to the receipt of said address and control signals from a processor, controlling communication between the processor port to which the processor is connected and a memory port corresponding to the address signals; the data storage member connected to that port, in response to said signals, communicating a data word between a cell of said member and the processor and producing acknowledgment signals which are coupled through the central controller to said processor to complete the communication of a data word between the processor and the data storage member and the communication cycle; wherein the improvements comprise: intersystem coupling means; circuit means interconnecting the intersystem coupling means with a memory port of the central controller of the first system; and circuit means interconnecting said intersystem coupling means with a processor port of the central controller of the second system; said intersystem coupling means comprising means for temporarily storing the data word to be communicated between the processor of the first system and the data storage member of the second system; means for transferring address and control signals to the processor port of the second system; and means for producing acknowledgment signals at the memory port of the central controller of the first system and at the processor port of the central controller of the second system to permit communication of a data word between a processor of the first system and the data storage member of the second system; said central controller of said first system, in response to predetermined address signals, connecting the address signals and control signals from a processor connected to one of its processor ports to the memory port to which the intersystem coupling means is connected; said intersystem coupling means, in response to the receipt of address and control signals from the central controller of the first system, transferring address and control signals to the processor port of the central controller of the second system, temporarily storing the data word being communicated between the system, and producing acknowledgment and control signals at the memory port of the central controller of the first system and the processor port of the second system controller to permit the communication of the data word to be completed.

7. The combination of claim 6 in which the improvements comprise a second intersystem coupling means, circuit means interconnecting the second intersystem coupling means with a memory port of a central controller of the second system and circuit means interconnecting said second intersystem coupling means with a processor port of the central controller of the first system.

References Cited

UNITED STATES PATENTS

| | | | |
|---|---|---|---|
| 3,061,192 | 10/1962 | Terzian | 235—157 |
| 3,242,467 | 3/1966 | Lamy | 340—172.5 |
| 3,263,219 | 7/1966 | Brun | 340—172.5 |
| 3,274,554 | 9/1966 | Hopper | 340—172.5 |
| 3,287,703 | 11/1966 | Slotnick | 340—172.5 |
| 3,323,109 | 5/1967 | Hecht | 340—172.5 |
| 3,363,234 | 1/1968 | Erickson | 340—172.5 |

OTHER REFERENCES

Duplexing MOBIDIC Computers, Stanley K. Chao and Gerald Rocheleau, Automatic Control, December 1959, pp. 46–52.

System Organization of MOBIDIC B, Stanley K. Chao, 1959 Eastern Joint Computer Conference, December 1959.

ROBERT C. BAILEY, Primary Examiner

R. F. CHAPURAN, Assistant Examiner